(No Model.)

W. SMITH.
BELT FASTENER.

No. 300,026. Patented June 10, 1884.

Witnesses:
Thomas F. Holden.
Ira C. Jennings

Inventor.
William Smith,
per Huggett & Smith,
Attys.

United States Patent Office.

WILLIAM SMITH, OF EATON RAPIDS, MICHIGAN.

BELT-FASTENER.

SPECIFICATION forming part of Letters Patent No. 300,026, dated June 10, 1884.

Application filed April 11, 1884. (No model.)

*To all whom it may concern:*

Be it known that I, WILLIAM SMITH, a citizen of the United States, residing at the city of Eaton Rapids, in the county of Eaton and State of Michigan, have invented certain new and useful Improvements in Belt-Fasteners; and I hereby declare the following to be a full and exact description of my invention, such as will enable others skilled in the art to which it appertains to make and use the same.

My invention relates to an improvement for fastening the ends of belts used in operating machinery by means of a metallic fastener; and the objects of my improvement are, first, to provide a simple, inexpensive, and durable fastener, easily attached and removed without injury to the belt; second, to afford facilities in running belts over or under pulleys; and, third, to hold the ends of the belt more securely as the tension of the belt is increased. I attain these objects by the mechanism illustrated in the accompanying drawings, in which—

Figure 1:
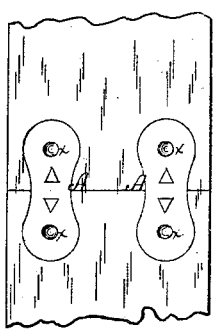
Figure 2:
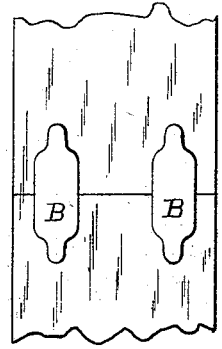
Figure 3:
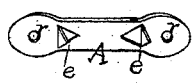
Figure 4:
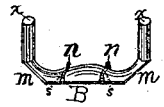

Figure 1 is a front view of the fastener as it appears on the outside of the belt. Fig. 2 is an inside front view of the fastener as it appears on the inside of the belt. Fig. 3 is a view in perspective of the top of the fastener, and Fig. 4 is a view of the bottom.

Similar letters refer to similar parts throughout the several views.

The perforated covering A and the ribbed and pointed clasp B form the various parts of my invention, and are constructed of any metallic substance in which B is malleable. The covering A has two or more brads or appendants, as $e\ e$, projecting from one side, and also two holes, $r\ r$, for receiving the posts $x\ x$ of the clasp B. The brads $e\ e$ are pointed and formed by being punched out of the covering A. The clasp B has rounded or slanting corners $m\ m$, is made crowning in the center, between the posts $x\ x$, and is provided with two or more annular ribs, $s\ s$, terminating in points $n\ n$. To fasten a belt, I punch holes in the ends at a proper distance, and put the posts $x\ x$ through the holes thus formed. I then place the cover A on the belt, so that the posts $x\ x$ pass through the holes $r\ r$, care being had to drive the covering A down firmly on the clasp B, so that the brads $e\ e$ and the points $n\ n$ of the annular ribs $s\ s$ penetrate the belt. I now rivet the ends down solid on the cover A. It is thus seen that in passing over a pulley the belt readily adjusts itself by sliding around the corners $m\ m$ of the clasp B, thereby preventing any wearing, tearing, or cracking of the belt; also, that in case of a heavy strain on the belt the clasp B will tend to straighten, and thus the crowning center will press more firmly against the belt and dent in the annular ribs $s\ s$. The brads $e\ e$ and the points $n\ n$, penetrating the belt, give additional strength to the fastener by taking part of the draft off from the posts $x\ x$.

I am aware that plates having an inner oval face, staples, double washers, and iron straps for uniting the ends of straps and belts are not new. I therefore do not claim such a device, broadly; but What I do claim, and desire to secure by Letters Patent, is—

A metallic belt-fastener consisting of the clasp B, having the slanting or circular corners $m\ m$, the annular ribs $s\ s$, and the points $n\ n$, in combination with the covering A, provided with the brads $e\ e$, all substantially as described, and for the purposes set forth.

WILLIAM SMITH.

Witnesses:
C. M. JENNINGS,
J. D. PARKHURST.